(12) United States Patent
Miyamoto

(10) Patent No.: US 12,501,892 B2
(45) Date of Patent: Dec. 23, 2025

(54) FISHING REEL

(71) Applicant: GLOBERIDE, INC., Higashikurume (JP)

(72) Inventor: Issei Miyamoto, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 142 days.

(21) Appl. No.: 18/386,824

(22) Filed: Nov. 3, 2023

(65) Prior Publication Data

US 2024/0172731 A1     May 30, 2024

(30) Foreign Application Priority Data

Nov. 30, 2022   (JP) ................. 2022-191400

(51) Int. Cl.
*A01K 89/01* (2006.01)
*A01K 89/015* (2006.01)

(52) U.S. Cl.
CPC .... *A01K 89/01931* (2015.05); *A01K 89/0186* (2015.05)

(58) Field of Classification Search
CPC ............ A01K 89/0186; A01K 89/0189; A01K 89/01901
See application file for complete search history.

(56) References Cited

U.S. PATENT DOCUMENTS

| 4,575,024 A | 3/1986 | Kaneko |
| 5,275,352 A | 1/1994 | Sato |
| 2021/0298280 A1 | 9/2021 | Yasuda |

FOREIGN PATENT DOCUMENTS

| JP | H03-16087 B2 | 3/1991 | |
| JP | 2594912 Y2 | 5/1999 | |
| JP | 2007-195433 A | 8/2007 | |
| JP | 2020-103043 A | 7/2020 | |
| JP | 2021-145654 A | 9/2021 | |
| KR | 102812743 B1 * | 5/2025 | ............ A01K 89/05 |

OTHER PUBLICATIONS

Mar. 11, 2024 Office Action issued in Taiwanese Patent Application No. 112142323.
Aug. 14, 2025 Office Action issued in Japanese Patent Application No. 2022-191400.
Sep. 17, 2025 Office Action issued in Chinese Patent Application No. 202311455511.8.

* cited by examiner

*Primary Examiner* — Emmanuel M Marcelo
(74) *Attorney, Agent, or Firm* — Oliff PLC

(57) ABSTRACT

A fishing reel of the present invention comprises a battery box that accommodates a replaceable battery in a side plate on a side opposite to a handle of a reel main body, a holding member that is movable integrally with a clutch operation member and holds a detection target unit, and a detection sensor that is disposed in the battery box and detects the moving detection target unit to determine whether a clutch mechanism is in an ON state or an OFF state. The holding member is engaged with a guide portion formed around the battery box, and the detection target unit is guided by the guide portion together with the holding member and moves when the clutch operation member moves.

4 Claims, 8 Drawing Sheets

FISHING REEL

CROSS-REFERENCE TO RELATED APPLICATION

This application claims priority under 35 U.S.C. § 119 to Japanese Patent Application No. 2022-191400 filed on Nov. 30, 2022 in the Japanese Patent Office, the entire contents of each hereby incorporated by reference.

BACKGROUND OF THE INVENTION

1. Technical Field

The present invention relates to a fishing reel for winding a fishing line around a spool through a winding operation of a handle.

2. Description of the Related Art

In the related art, as a fishing reel, a double-bearing reel in which a spool is rotatably supported between side plates of a reel main body is known, and such a double-bearing reel is equipped with a counter display function of displaying a release amount (water depth) of a fishing line when a clutch mechanism is turned off and the spool is set to a free rotation state. Normally, the release amount of the fishing line is calculated according to a predetermined program by arranging a magnet on the side surface of the spool and detecting the magnet with a magnetic sensor provided on the reel main body to detect a rotation amount of the spool.

In the double-bearing reel described above, there are cases where it is desired to detect the movement of an actuating member and add a new function in addition to detecting the rotation of the spool. In this case, it is necessary to provide a detection unit (various sensors) that detects the displacement of the actuating member, but incorporating the detection unit in the side plate on the handle side has a problem in reducing the size of the reel main body. In particular, although it is desired to reduce the size of a recent hand-wound double-bearing reel, a power transmission mechanism for transmitting a driving force from a drive gear installed on a handle shaft, a drag mechanism, and the like are installed in a side plate on the handle side. Therefore, space is limited, and it is difficult to install a detection unit to reduce the size.

In the present invention, as will be described below, it is planned to dispose a detection unit (also referred to as a clutch sensor) that detects ON and OFF of the clutch. However, in the related art, there is no technical idea of providing such a clutch sensor in a hand-wound double-bearing reel (double-bearing reel to be miniaturized).

In the double-bearing reel of the related art, there is a method of detecting the operation of the clutch operation member if the ON and OFF of the clutch is to be detected. Regarding the clutch operation member, a configuration in which the clutch operation member is installed between left and right side plates behind the spool so as to be movable up and down is known (see, for example, JP H3-016087 B2 and JP 2594912 U). The clutch operation member disclosed in JP H3-016087 B2 has a structure in which protrusions are formed on both side surfaces of a clutch operation member whose one side is connected to a clutch mechanism, and the protrusions are guided and supported in a vertically movable manner by long holes formed in left and right frames. The clutch operation member disclosed in JP 2594912 U has a so-called cantilever support structure in which one side of the clutch operation member is connected to a clutch mechanism.

SUMMARY OF THE INVENTION

The clutch operation members disclosed in JP H3-016087 B2 and JP 2594912 U are not intended to have a precise support structure, and thus rattling, deformation, and the like easily occur. Therefore, stable detection capability cannot be secured when detecting the displacement of the clutch operation member, and erroneous detection may occur. In addition, there is no technical idea of installing a clutch sensor in order to detect the operation of the clutch operation member in the first place in a hand-wound double-bearing reel intended to be downsized, and there is no configuration in which a detection unit that stably detects the ON and OFF operation of the clutch is disposed on the side plate on the side opposite to the handle in the conventional technique without increasing the size of the reel main body.

The present invention has been made in view of the above problems, and an object of the present invention is to provide a fishing reel comprising a clutch sensor capable of stably detecting an ON and OFF operation of a clutch without increasing the size of a reel main body.

In order to achieve the above object, a fishing reel according to the present invention comprises: a spool rotatably supported between left and right side plates of a reel main body; a handle that rotationally drives the spool; a battery box that is provided on a side plate on a side opposite to the handle between the left and right side plates and accommodates a replaceable battery; a clutch mechanism comprising a clutch operation member that switches the spool between a free rotation state and a fishing line winding state; a holding member that is integrally movable with the clutch operation member and holds a detection target unit; and a detection sensor that is disposed in the battery box and detects the moving detection target unit to determine whether the clutch mechanism is in an ON state or an OFF state, in which the holding member is engaged with a guide portion formed around the battery box, and the detection target unit moves together with the holding member while being guided by the guide portion when the clutch operation member moves.

In the above configuration, when the clutch operation member moves along with ON and OFF of the clutch mechanism, the detection target unit held by the holding member moves integrally, and the detection sensor disposed in the battery box detects this movement to determine whether the clutch mechanism is in the ON state or the OFF state. The holding member is engaged with a guide portion formed around the battery box, and the detection target unit moves together with the holding member while being guided by the guide portion when the clutch operation member moves. Therefore, the movement of the detection target unit is stabilized, and the detection sensor can ensure stable detection capability.

According to the present invention, it is possible to obtain a fishing reel capable of detecting a stable ON and OFF operation of a clutch.

BRIEF DESCRIPTION OF THE DRAWINGS

FIGS. 4A and 4B are diagrams illustrating a configuration of a battery box portion, in which FIG. 4A is a view as viewed from a rear side, and FIG. 4B is a view as viewed from a front side;

DETAILED DESCRIPTION

Figure 1:
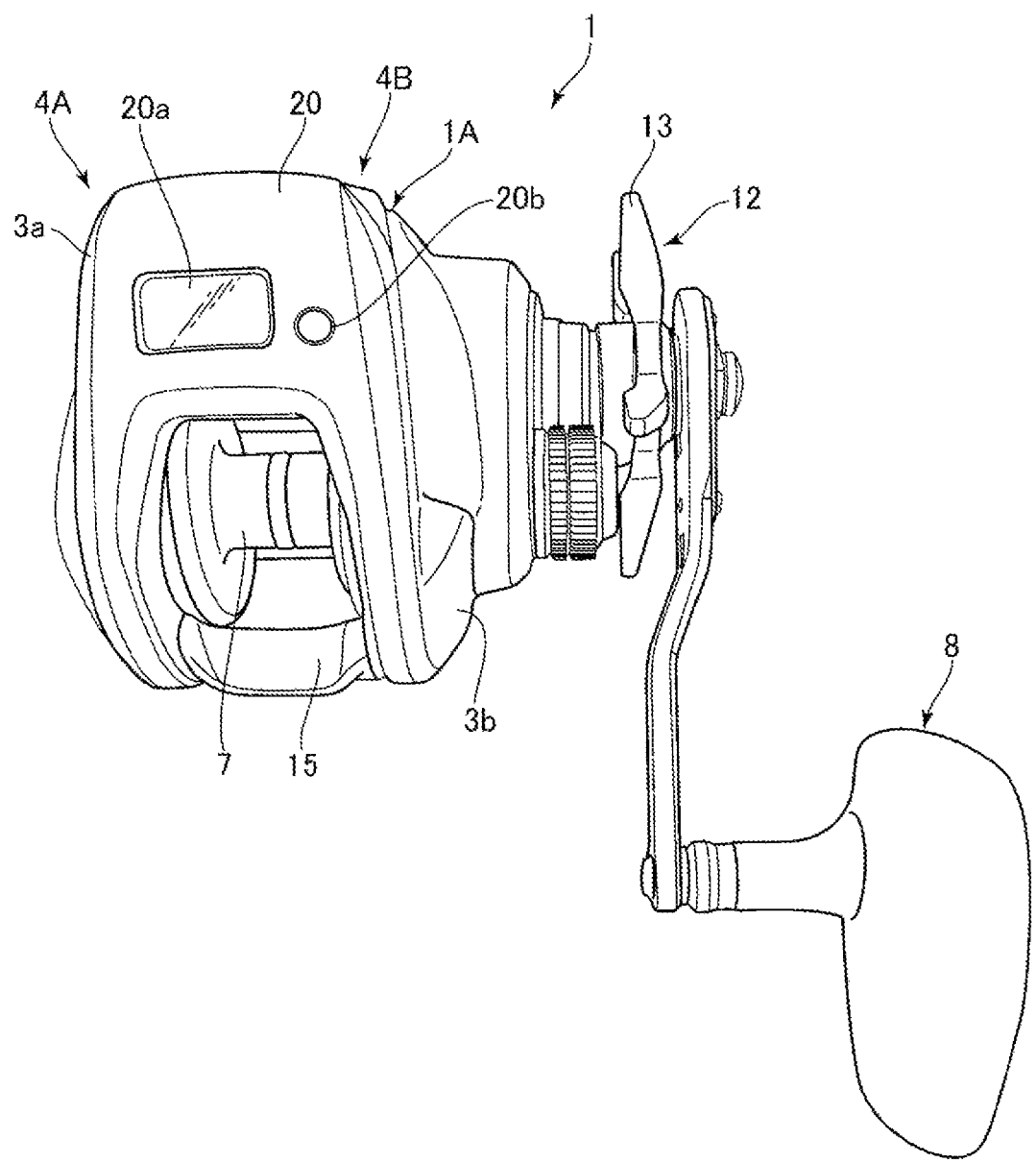
FIG. 1 is a plan view illustrating an embodiment of a fishing reel according to the present invention.
Figure 2:
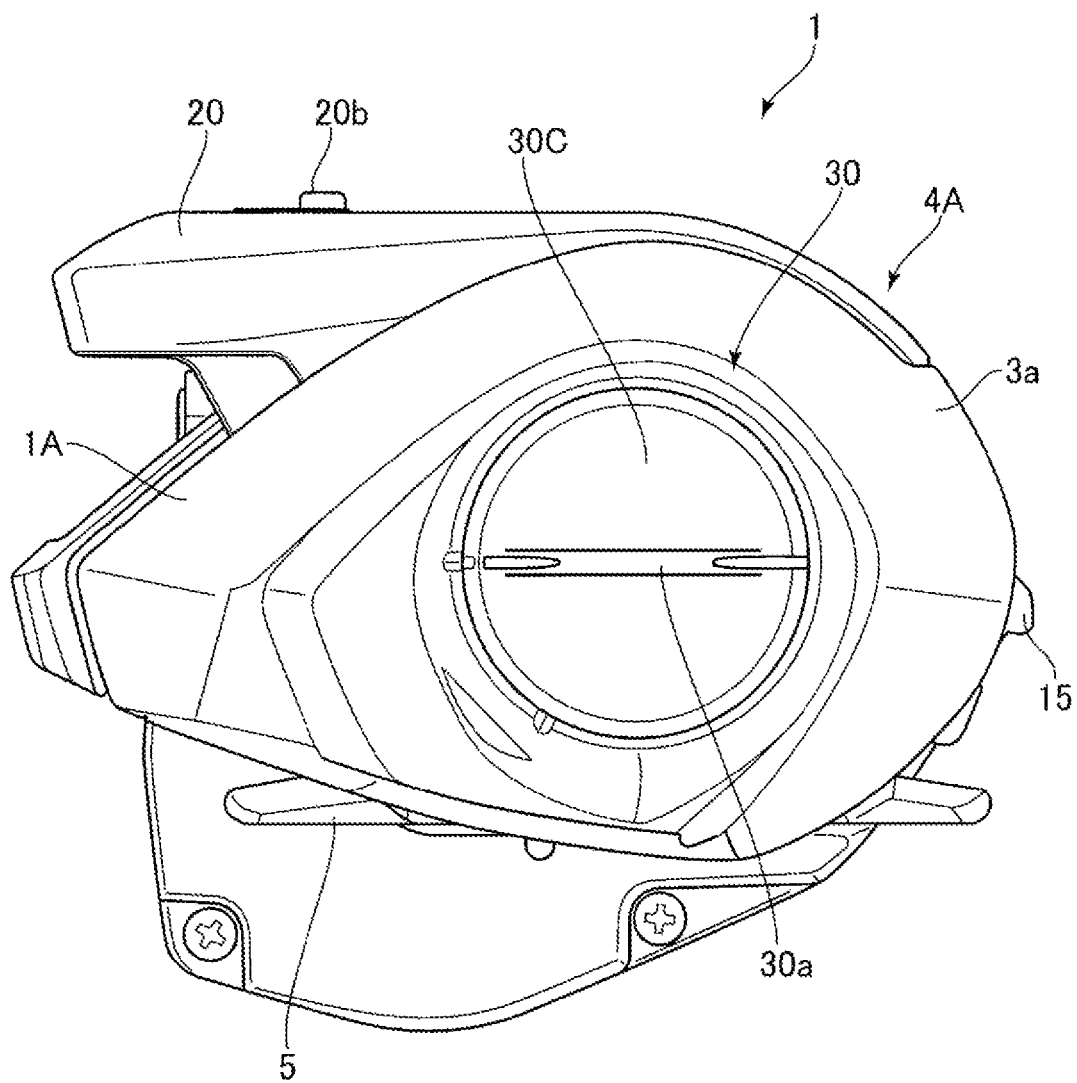
FIG. 2 is a side view viewed from a side opposite to the handle of the fishing reel illustrated in FIG. 1.

Hereinafter, an embodiment of a hand-wound double-bearing reel (hereinafter, referred to as a reel) which is a fishing reel according to the present invention will be described with reference to the drawings. FIG. 1 is a plan view illustrating an embodiment of a reel, FIG. 2 is a side view as viewed from the side opposite to the handle, and FIG. 3 is a view illustrating a state in which a cover member is removed from the state illustrated in FIG. 2.

Figure 3:
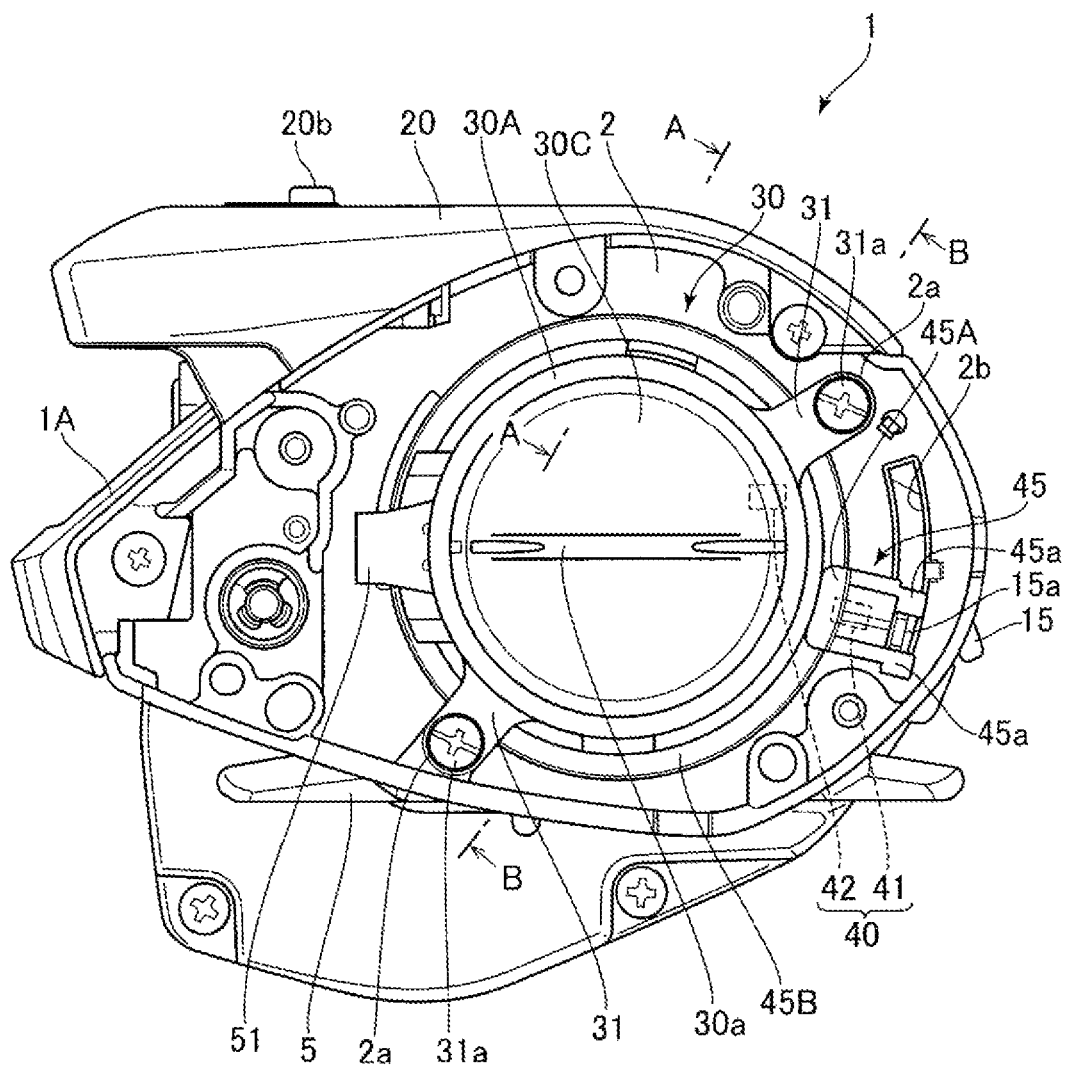
FIG. 3 is a view illustrating a state in which a cover member is removed from the state illustrated in FIG. 2.
Figure 4A:
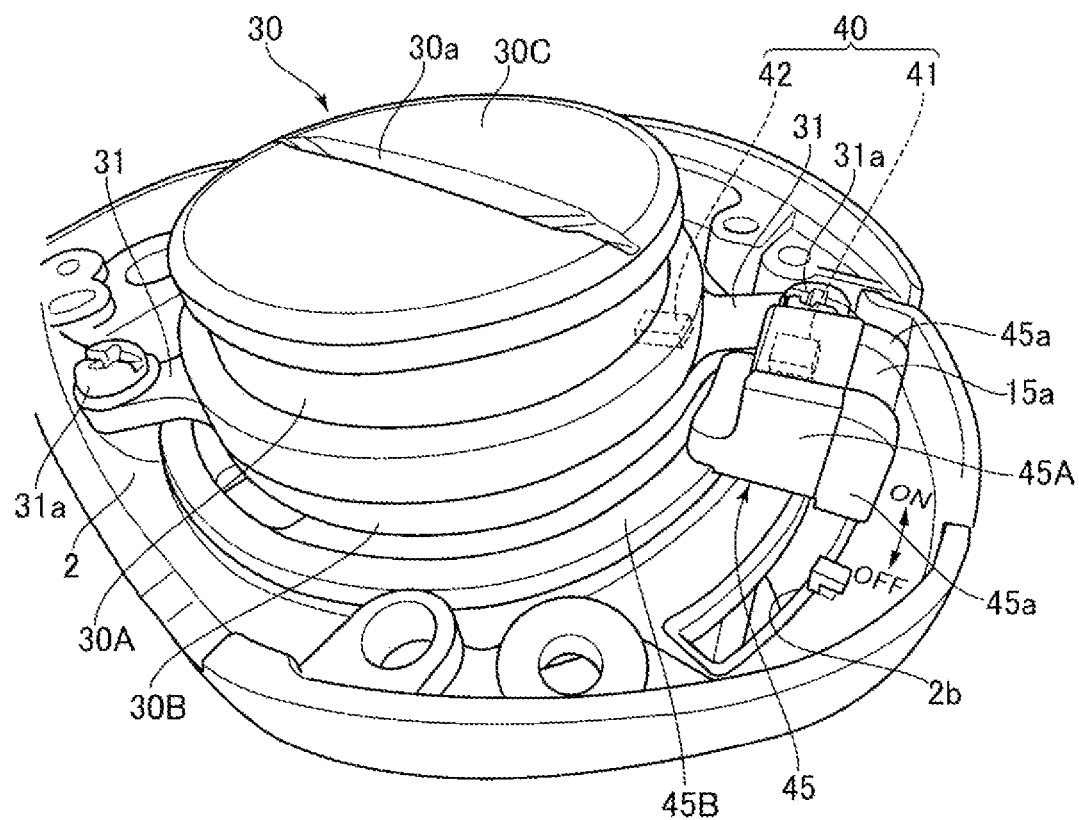
Figure 4B:
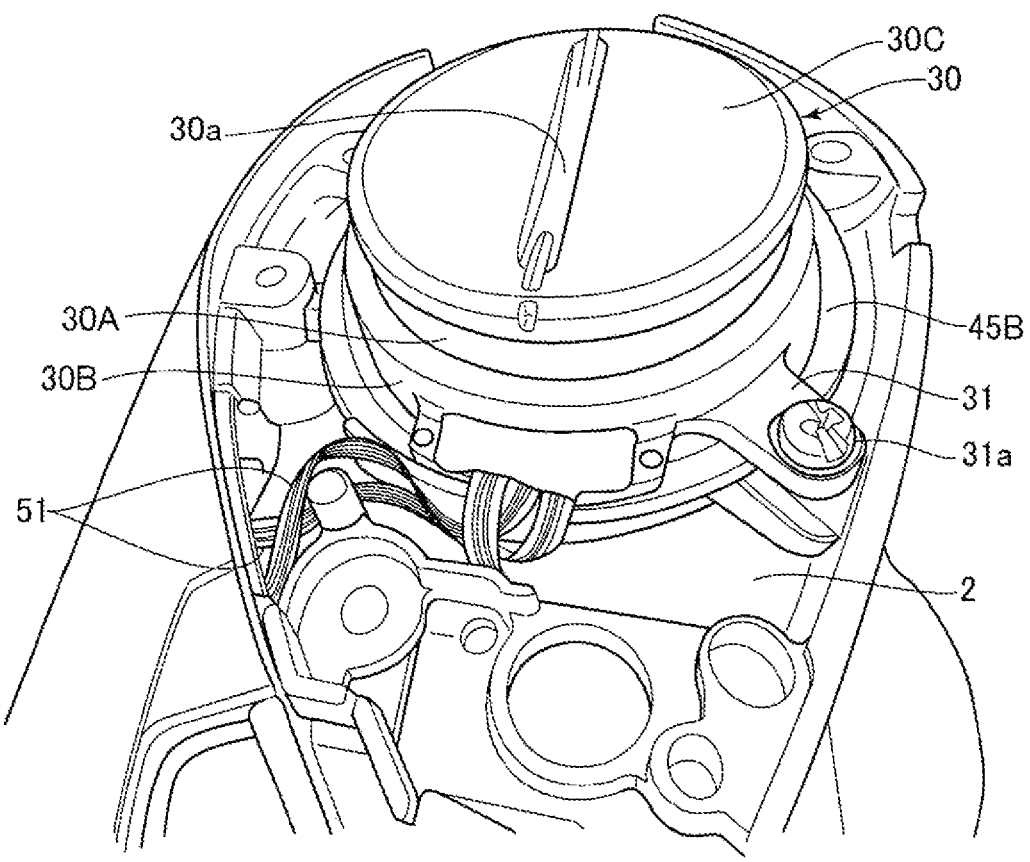
Figure 5:
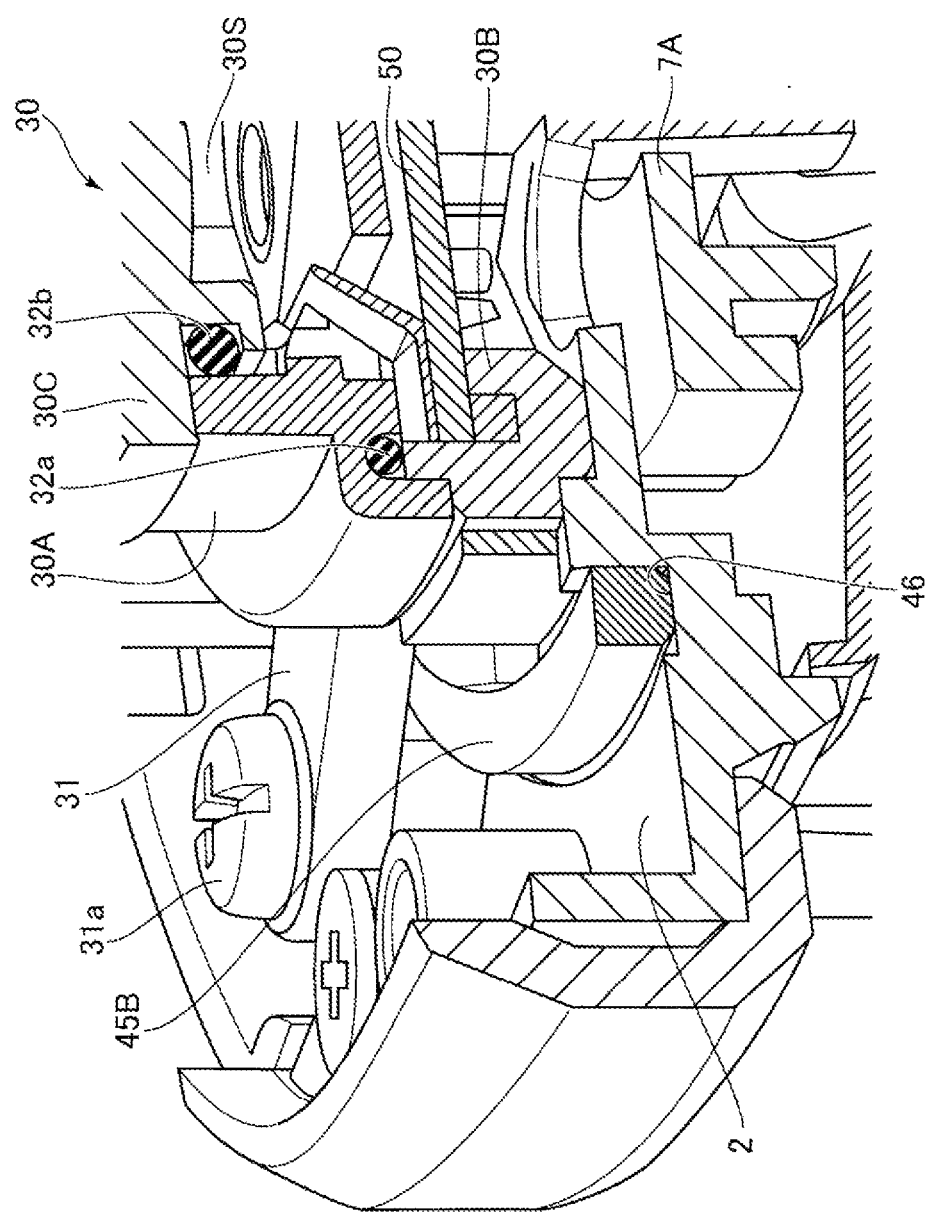
FIG. 5 is a diagram illustrating an internal structure of a battery box, and is a cross-sectional view taken along line A-A of FIG. 3.

The reel main body 1A of the reel 1 according to the present embodiment comprises left and right side plates 4A and 4B provided with left and right covers 3*a* and 3*b* attached to left and right frames (a left frame 2 is shown in FIG. 3), and the left and right frames are integrated via a plurality of supports as is known. In addition, a reel leg 5 to be attached to a reel seat of a fishing rod is integrally formed with the frame between the left and right frames.

A spool shaft is rotatably supported between left and right side plates of the reel main body 1A via a bearing, and a spool 7 around which a fishing line is wound is fixed to the spool shaft. The spool 7 is rotationally driven via a known winding drive mechanism arranged in the right side plate by rotationally operating a handle 8 provided on one side plate (the right side plate 4B in the present embodiment).

In addition, the right side plate 4B is provided with a known drag mechanism 12 that applies a drag force to the spool 7 when the fishing line is fed out from the spool 7 at the time of fishing. The drag mechanism 12 comprises a plurality of braking members frictionally engaged with a side surface of a drive gear of a winding drive mechanism rotatably mounted on a handle shaft, and a braking force adjusting body (also referred to as a star drag) 13 that applies a pressing force to the braking members. The braking force adjusting body 13 is provided on the reel main body side near the handle 8 so as to be rotatable with respect to the handle shaft, and a frictional force (drag force) of the drive gear with respect to the handle shaft can be adjusted by applying a pressing force to the braking member by rotationally operating the braking force adjusting body 13.

The winding drive mechanism comprises a drive gear rotatably attached to a handle shaft, a pinion gear meshing with the drive gear, and the like, and has a function of transmitting rotation of the handle shaft to the spool 7 via the drag mechanism 12, the drive gear, and the pinion gear. In addition, the pinion gear moves in an axial direction by the operation of a known clutch mechanism disposed in the right side plate and is disengaged from the spool shaft, whereby a power transmission state (clutch ON) and a power interruption state (clutch OFF) are switched.

The clutch mechanism comprises a clutch operation member 15 disposed between the left and right side plates 4A and 4B on a rear side of the spool 7, and when the clutch operation member 15 is pushed down, the spool 7 is brought into a clutch-OFF state where the spool 7 freely rotates forward and backward. In addition, by winding the handle 8 in the clutch-OFF state, the clutch is turned into a clutch-ON state via a known automatic return mechanism, and the fishing line can be wound around the spool 7 by winding the handle 8 while in the clutch-ON state.

Between the left and right side plates of the reel main body 1A, an information display device (an IC counter) 20 having a display unit 20*a* is disposed above the spool 7. The information display device 20 also has a function as a thumb rest, and the display unit 20*a* displays, for example, various types of information such as line length information, shelf information, time information, and the like, which detects the rotation of the spool 7 and is fed out from the spool when the clutch is turned off. Note that the information display device 20 is provided with an operation button 20*b*, and a user can input various types of setting information (although one operation button is provided in FIG. 1, a plurality of operation buttons may be provided).

The line length information (unreeling length, unreeling speed, and the like of fishing line) is calculated according to a predetermined calculation program based on a detection signal from a detection sensor adapted to detect a rotation amount and a rotation direction of the spool 7. On the side plate 4A on the side opposite to the handle, components of a control device that controls various types of information are disposed, such as the detection sensor, a control board that processes a detection signal from the detection sensor, a cable for transmitting and receiving a signal between the control board and the information display device 20, and a power source (battery box) for operating these components.

In the present invention, in the hand-wound double-bearing reel with the IC counter function as described above, the operation of the clutch operation member 15 of the clutch mechanism is detected and a new function is added in addition to the detection of the rotation of the spool 7. Specifically, in the present embodiment, when the spool 7 rotates in a fishing line releasing direction in a state where the drag mechanism is in operation, a function of notifying the rotation state by sound is provided. In this case, the spool 7 rotates in the fishing line releasing direction when the spool 7 rotates freely in the clutch-OFF state, or when a fish is caught in the clutch-ON state and the spool 7 rotates while the drag mechanism acts. In the present embodiment, it is detected that the spool 7 is in the clutch-ON state, and the notification sound is made when the spool 7 rotates in a fishing line unreeling direction in the clutch-ON state.

That is, a position of the clutch operation member 15 is detected to discriminate between the clutch-ON state and the clutch-OFF state, and when the spool 7 rotates in the fishing line releasing direction in the clutch-ON state, the rotation can be notified by sound.

The detection device (hereinafter, also referred to as a clutch sensor) having the function as described above can be provided in association with the clutch mechanism disposed in the side plate on the handle side. However, since the winding drive mechanism, the drag mechanism, the automatic return mechanism, and the like are disposed in the side plate on the handle side as described above, if the detection device is disposed here, the reel main body is enlarged. In particular, it is sometimes required to downsize the reel main body as much as possible in the hand-wound double-bearing reel as in the present embodiment, and further, in the small electric reel capable of the hand-held operation, and it is preferable that the detection device is configured to obtain a stable detection result efficiently.

In the present embodiment, the clutch sensor is efficiently disposed using the battery box 30 installed on the side plate 4A on the side opposite to the handle, and a stable detection operation can be obtained. Hereinafter, a configuration of the clutch sensor according to the present embodiment will be described with reference to FIGS. 3 to 6.

FIG. 3 illustrates the side plate 4A on the side opposite to the handle, and illustrates a state in which the left cover 3a is removed from the state illustrated in FIG. 2.

The side plate 4A is provided with a battery box 30 that supplies power to the information display device 20. The battery box 30 accommodates a battery (button battery, see FIG. 6) 80 about the size of a 500 yen coin, and comprises a substantially cylindrical first main body 30A, a second main body 30B integrated with the first main body 30A and fixed to the frame 2 of the reel main body, and a lid member 30C that closes an opening portion of the first main body 30A. As a control board (circuit board) 50, a substantially disk-shaped one is used in accordance with the shape of the battery box, and a central portion thereof is fixed to the second main body 30B by a fixing screw 50a. A cable 51 having a function of transmitting and receiving a signal to and from the information display device 20 and a function of supplying power to the information display device is connected to the control board 50.

Figure 6:
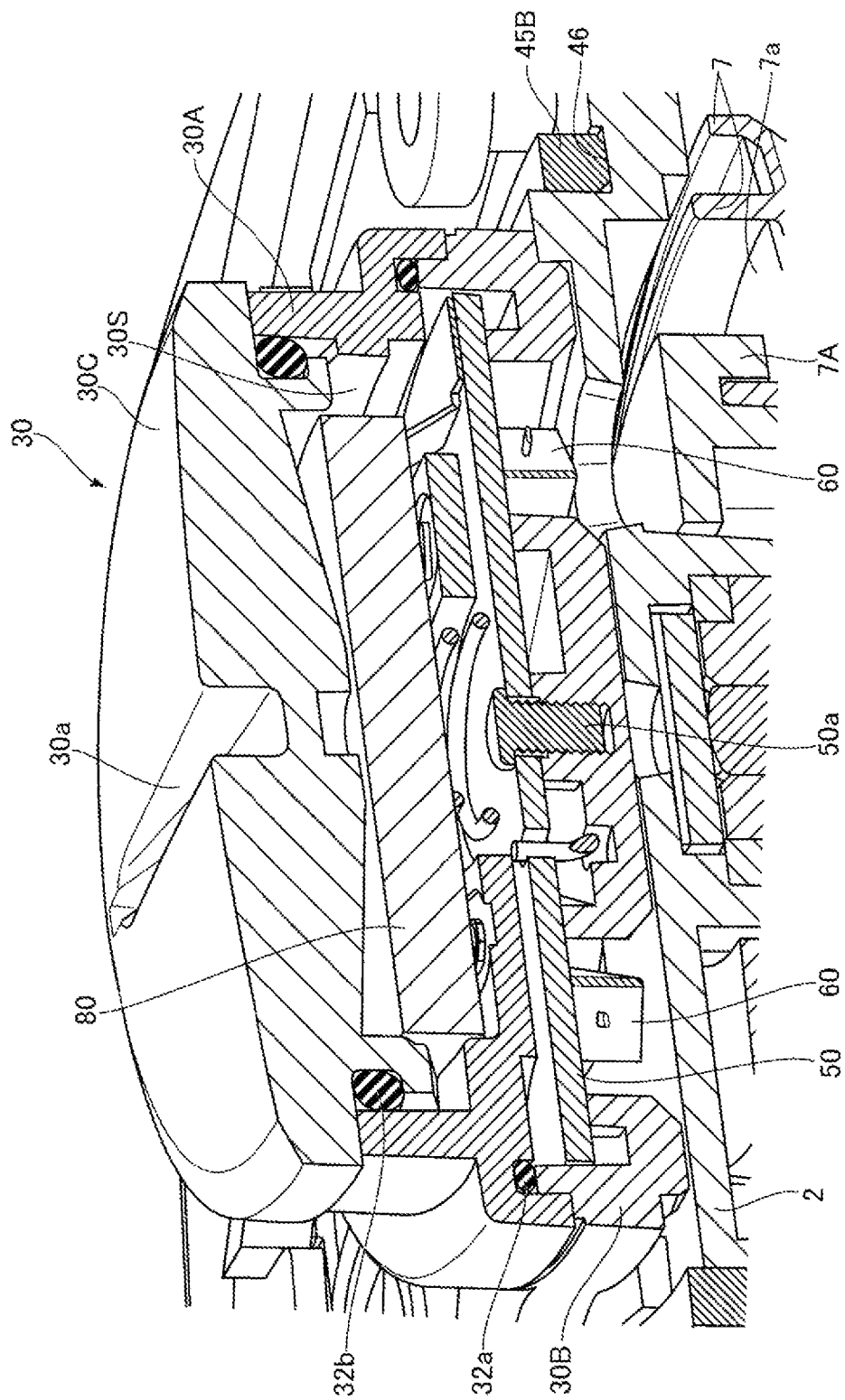
FIG. 6 is a diagram illustrating an internal structure of a battery box, and is a cross-sectional view taken along line B-B of FIG. 3.

As described above, the battery box 30 of the present embodiment has a shape having an outer peripheral surface with a substantially circular cross section, and is fixed to the frame 2 in the left side plate 4A. As illustrated in FIG. 6, in the battery box 30, O-rings (sealing members) 32a and 32b are interposed between the first main body 30A and the second main body 30B and between the first main body 30A and the lid member 30C, and the housing portion 30S in the battery box is subjected to waterproof processing.

The battery box 30 is fixed to the frame 2 by a predetermined fixing structure. In the present embodiment, a fixing piece 31 protruding in a radial direction is formed in the first main body 30A (or the second main body 30B), and is fixed to a fixing portion 2a provided in the frame 2. The battery box 30 is fixed by, for example, screwing screws 31a into the fixing portion 2a, and the fixing structure of the present embodiment is provided at two places at intervals of approximately 180° (see FIG. 3).

As illustrated in FIG. 2, the lid member 30C is substantially flush with the left cover 3a and exposed to the side surface, and a long groove 30a is formed on the surface thereof. Therefore, when the battery is exhausted, the user can insert a coin or the like into the long groove 30a, remove the lid member 30C, and replace the battery with a new battery.

The battery box 30 is provided with a clutch sensor 40 capable of detecting ON operation and OFF operation of the clutch mechanism in association with each other. The clutch sensor 40 of the present embodiment is configured to detect an ON and OFF operation of the clutch operation member 15, and is configured to detect an OFF state when the clutch operation member 15 is pushed down from an initial position and an ON state when the clutch operation member 15 returns to the initial position. In addition, the clutch sensor 40 of the present embodiment comprises a detection target unit (a magnet 41) provided on the side to be displaced and a detection sensor (a Hall element 42) provided on the battery box 30 side to detect a change in a magnetic field of the magnet 41 to be displaced, and a magnetic sensor having a simple structure is used.

The clutch operation member 15 is disposed on the rear side of the spool 7 so as to be vertically movable between the left and right frames. FIGS. 3 to 6 illustrate the left frame 2 which is a frame on the side opposite to the handle, and the end 15a of the clutch operation member 15 is held in the long hole 2b formed in the frame 2 so as to be movable up and down. Similarly to the left frame, the other end of clutch operation member 15 is vertically movably held in a long hole formed in the right frame (not shown), whereby clutch operation member 15 is configured to stably move vertically.

The end 15a of the clutch operation member 15 is inserted into the long hole 2b, and a protruding portion from the long hole 2b is connected to the holding member 45 provided with the magnet 41. Specifically, the holding member 45 of the present exemplary embodiment comprises a holding body 45A incorporating the magnet 41, and an engaging portion 45B to be described below, and the end 15a of the clutch operation member 15 is fitted into a bifurcated projection 45a formed on the holding body 45A. Therefore, when the clutch operation member 15 is moved in a vertical direction by the ON and OFF operation of the clutch, the holding member 45 is integrally movable.

In addition, the holding member 45 is engaged with a guide portion formed around the battery box 30, and is guided so that the above-described movement of the holding member 45 is stabilized. In the present embodiment, the holding member 45 and the guide portion are in a concavo-convex engagement state, and the holding member 45 is configured to move in the concavo-convex engagement state. Specifically, the guide portion is constituted by a groove 46 formed in a circular shape (or an arc shape) along the outer peripheral surface of the battery box 30 on the exposed surface side of the frame 2, and a ring-shaped (or C-ring-shaped) guide plate 45B is integrally formed on the holding member 45 so as to engage (fit) with the groove 46 (see FIGS. 4A to 6).

In the configuration described above, the guide plate 45B is preferably retained in an axial direction by the fixing piece 31 provided in the battery box 30 (see FIG. 3). Further, it is preferable to provide a clearance at a connection portion between the clutch operation member 15 and the holding member 45 (the holding body 45A). For example, some degree of clearance may be provided for fitting between end 15a of clutch operation member 15 and the bifurcated projection 45a formed on holding body 45A.

The left side plate 4A is provided with a spool sensor 60 that detects a rotation speed (rotation amount) and a rotation direction of the spool 7, and the spool sensor 60 is also disposed in association with the battery box 30. The spool sensor 60 of the present embodiment comprises a reed switch 61 that opens and closes by a magnetic field change, and three reed switches 61 are disposed along the circumferential direction within the range of the side surface of the spool 7. The spool sensor 60 comprises a detection target unit (a magnet 62) detected by the reed switch 61, and the magnet 62 is held by the magnet holding member 7A fixed to the side surface 7a of the spool 7 (the magnet 62 may be configured to be directly fixed to the side surface 7a of the spool 7).

The reed switch 61 disposed along the circumferential direction is mounted on the back surface side (frame side) of the control board 50 fixed in the battery box 30, and the detection sensor 42 as the clutch sensor is mounted on the front surface side (left cover 3a side) of the control board 50.

That is, the clutch sensor 40 and the spool sensor 60 are mounted on both surfaces of the control board 50 installed in the battery box 30 which is previously subjected to the waterproof processing. As a result, it is not necessary to perform waterproof processing for protecting the sensor, and the detection sensor can be simplified and made compact.

Figure 7:
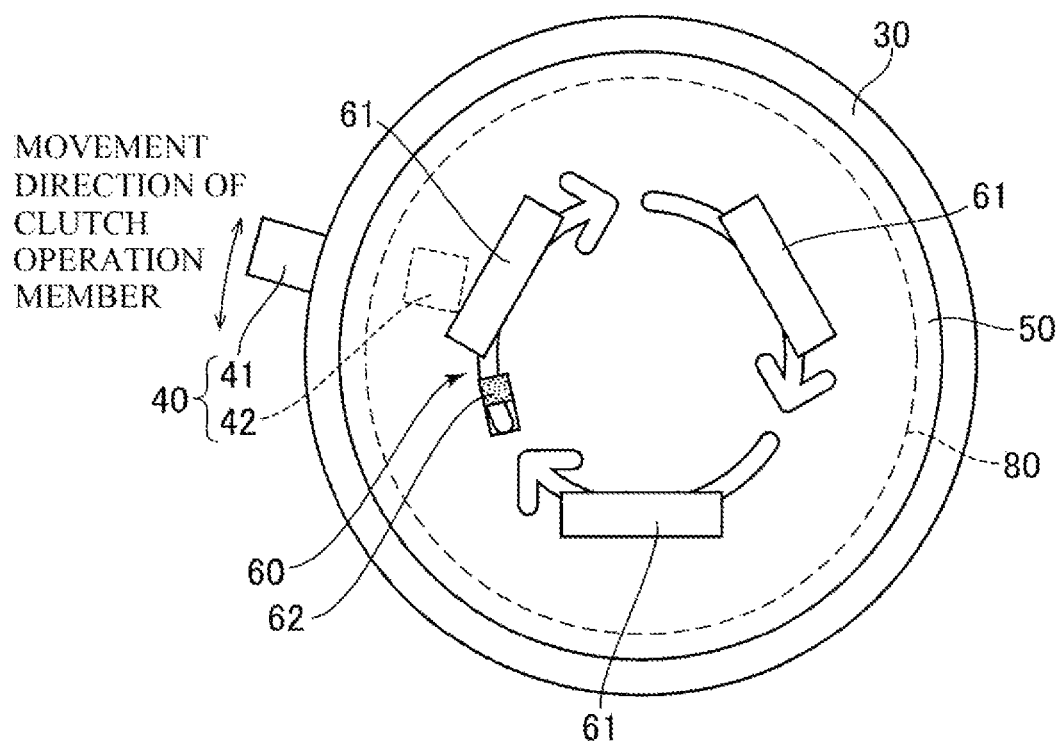
FIG. 7 is a view illustrating a control board installed in a battery box and a positional relationship between a clutch sensor and a spool sensor, and is a schematic view as viewed from a spool side.

FIG. 7 is a view illustrating the control board 50 installed in the battery box 30 and a positional relationship between the clutch sensor 40 and the spool sensor 60, and is a schematic view as viewed from the spool side. In the present embodiment, as described above, since both the clutch sensor 40 and the spool sensor 60 are constituted by magnetic sensors that detect a change in a magnetic field, in a configuration in which these detection sensors are installed in the battery box 30, it is necessary to consider arrangement positions of both sensors. In the present embodiment, the detection sensors 42 and 61 are installed on both sides of the control board 50 hermetically accommodated in the battery box, respectively, to suppress interference of magnetic fields. In addition, the detection sensors 42 and 61 are not installed outside the control board 50, but are installed on both sides within the range of the control board, so that the detection sensors can be efficiently accommodated in the battery box.

In this case, if the thickness of the control board 50 is large, the detection sensors 42 and 61 are not affected by the magnetic fields of the magnets 41 and 62. Therefore, the installation positions of the detection sensors and are not particularly limited. However, if the thickness of the control board 50 is small, the magnetic fields of the magnets 41 and 62 may interfere with each other. Therefore, as illustrated in FIG. 7, the detection sensors 42 and 61 are preferably disposed not to overlap each other in the axial direction.

In the present embodiment, the above-described clutch sensor 40 is used to emit a sound (drag sound) when the above-described spool sensor 60 detects the rotation in the fishing line releasing direction, for example, in a case where it is determined that the clutch mechanism is in the ON state. For example, when a fish is caught when the clutch mechanism is in the ON state, a fishing person can grasp that the drag mechanism slides and the fishing line is fed out. Note that, in the notification sound in such a state, a sound volume is changed or a sound quality is changed according to the rotation speed of the spool, so that the fishing person can grasp the braking state of the drag mechanism.

According to the fishing reel described above, the following operational effects can be obtained. Since the clutch sensor 40 is not installed on the side plate on the handle side but is installed on the side plate on the side opposite to the handle, it is possible to efficiently utilize the space without increasing the size of the reel main body. In particular, in a hand-wound double-bearing reel or a small electric reel capable of the hand-held operation, a new function can be installed without increasing the size of the reel main body.

In addition, since the detection sensor 42 is disposed using the internal space of the battery box 30, a waterproof measure using a seal structure of the battery box 30 can be taken, and it is not necessary to separately provide a waterproof structure in the detection sensor, so that the structure can be simplified and downsized. In this case, by using the magnetic sensor as the detection sensor, the structure is simplified, and the internal space in the battery box 30 can be efficiently used.

When clutch operation member 15 moves in accordance with the ON and OFF operation of the clutch mechanism, magnet 41 held by holding body 45A of holding member 45 integrally moves in the vertical direction along with the movement of clutch operation member 15. The detection sensor 42 disposed in the battery box 30 detects a change in the magnetic field of the magnet 41 in the holding body 45A, detects the position of the clutch operation member 15, and determines whether the clutch mechanism is in the ON state or the OFF state. In the holding member 45, the ring-shaped guide plate 45B is engaged with the guide portion (groove 46) formed in the frame 2 along the outer peripheral surface of the main body of the battery box 30 in a concavo-convex manner, and the guide plate 45B can be stably rotated, so that the holding body 45A holding the magnet 41 is also guided in a stable state. Therefore, stable detection capability can be secured.

In particular, in the present embodiment, since the guide plate 45B of the holding member 45 rotates along the circumferential direction of the battery box, it is possible to perform setting so as to maintain the same distance with the detection sensor 42, and it is possible to exhibit stable detection capability.

Further, in the present embodiment, since the guide plate 45B is prevented from coming off in the axial direction by the fixing piece 31 provided in the battery box 30, the guide plate 45B is not displaced in the axial direction, and it is possible to exhibit stable detection capability. Further, by providing a clearance at a coupling portion between the clutch operation member 15 and the holding member 45 (the holding body 45A), even if rattling occurs during movement of the clutch operation member, the rattling can be absorbed, and a stable detection capability can be secured without affecting rotation of the guide plate 45B.

Although the embodiments of the present invention have been described above, the present invention is not limited to the above-described embodiments, and various modifications can be made without departing from the spirit of the present invention.

For example, in the present embodiment, the cylindrical battery box 30 is mounted, and the guide portion is formed in a circular shape or an arc shape so as to be efficiently disposed. However, in a case where the battery box has a cubic (rectangular parallelepiped) shape, the guide portion can be appropriately deformed such as extending in the vertical direction or extending in the front-rear direction according to the shape of the battery box. That is, the shape of the guide portion can be appropriately modified according to the shape of the accommodated battery and the shape of the battery box.

In addition, although the holding member (the guide plate) and the guide portion are engaged with each other in a concavo-convex manner, the guide method can be appropriately modified, for example, by forming a convex portion on the frame 2 side and forming a concave portion on the guide plate side. Furthermore, the detection sensor is not limited to the magnetic sensor, and can be appropriately modified, for example, using an optical sensor.

What is claimed is:
1. A fishing reel comprising:
    a spool rotatably supported between left and right side plates of a reel main body;
    a handle that is configured to rotationally drive the spool;
    a battery box that is provided on a side plate on a side opposite to the handle between the left and right side plates and accommodates a replaceable battery;
    a clutch mechanism comprising a clutch operation member that is configured to switch the spool between a free rotation state and a fishing line winding state;

a holding member that is integrally movable with the clutch operation member and holds a detection target unit; and a detection sensor that is disposed in the battery box and configured to detect the moving detection target unit to determine whether the clutch mechanism is in an ON state or an OFF state;

wherein the holding member is engaged with a guide portion formed around the battery box, the detection target unit moves together with the holding member while being guided by the guide portion when the clutch operation member moves, the guide portion is formed in a frame constituting the left and right side plates, the holding member and the guide portion are engaged with each other in a concavo-convex manner, the battery box comprises an outer peripheral surface having a circular cross section, the guide portion is formed in a circular shape or an arc shape along the outer peripheral surface of the battery box, and the holding member comprises a holding body that holds the detection target unit and is connected to the clutch operation member, and a guide plate that is fitted to the guide portion and integrated with the holding body.

2. The fishing reel according to claim 1, wherein the detection target unit is a magnet, and the detection sensor is a Hall element sealed in the battery box.

3. A fishing reel comprising:

a spool rotatably supported between left and right side plates of a reel main body;

a handle that is configured to rotationally drive the spool;

a battery box that is provided on a side plate on a side opposite to the handle between the left and right side plates and accommodates a replaceable battery;

a clutch mechanism comprising a clutch operation member that is configured to switch the spool between a free rotation state and a fishing line winding state;

a holding member that is integrally movable with the clutch operation member and holds a detection target unit; and a detection sensor that is disposed in the battery box and configured to detect the moving detection target unit to determine whether the clutch mechanism is in an ON state or an OFF state;

wherein the holding member is engaged with a guide portion formed around the battery box, the detection target unit moves together with the holding member while being guided by the guide portion when the clutch operation member moves, the guide portion is formed in a frame constituting the left and right side plates, the holding member and the guide portion are engaged with each other in a concavo-convex manner, the battery box comprises an outer peripheral surface having a circular cross section, the guide portion is formed in a circular shape or an arc shape along the outer peripheral surface of the battery box, the battery box comprises a fixing piece that protrudes in a radial direction and is fixed to a fixing portion provided on the frame, and the guide portion is retained by the fixed piece fixed to the frame.

4. A fishing reel comprising:

a spool rotatably supported between left and right side plates of a reel main body;

a handle that is configured to rotationally drive the spool;

a battery box that is provided on a side plate on a side opposite to the handle between the left and right side plates and accommodates a replaceable battery;

a clutch mechanism comprising a clutch operation member that is configured to switch the spool between a free rotation state and a fishing line winding state;

a holding member that is integrally movable with the clutch operation member and holds a detection target unit; and a detection sensor that is disposed in the battery box and configured to detect the moving detection target unit to determine whether the clutch mechanism is in an ON state or an OFF state;

wherein the holding member is engaged with a guide portion formed around the battery box, the detection target unit moves together with the holding member while being guided by the guide portion when the clutch operation member moves, the guide portion is formed in a frame constituting the left and right side plates, the holding member and the guide portion are engaged with each other in a concavo-convex manner, the battery box comprises an outer peripheral surface having a circular cross section, the guide portion is formed in a circular shape or an arc shape along the outer peripheral surface of the battery box, and a clearance is provided at a connection portion between the clutch operation member and the holding member.

* * * * *